Nov. 6, 1928.  1,690,363
J. E. EGLESON
METHOD OF TREATING SOLID MATERIALS WITH LIQUID REAGENTS
Filed March 7, 1927
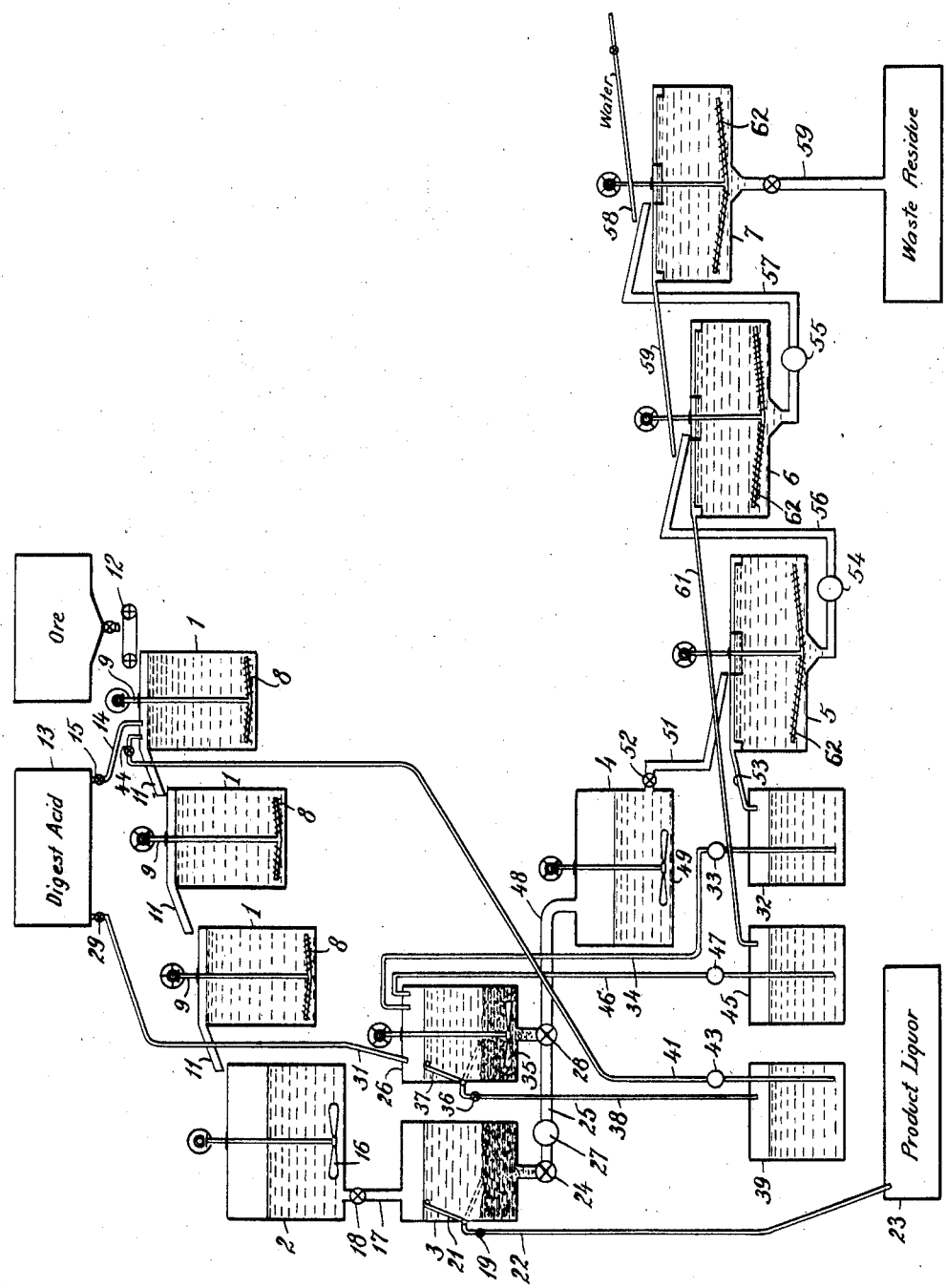
INVENTOR
James E. Egleson
BY
ATTORNEY Patented Nov. 6, 1928.

1,690,363

UNITED STATES PATENT OFFICE.

JAMES E. EGLESON, OF EAST ORANGE, NEW JERSEY, ASSIGNOR TO GENERAL CHEMICAL COMPANY, OF NEW YORK, N. Y., A CORPORATION OF NEW YORK.

METHOD OF TREATING SOLID MATERIALS WITH LIQUID REAGENTS.

Application filed March 7, 1927. Serial No. 173,429.

This invention relates to the treatment of solid materials with liquid reagents, and particularly to the digestion of ores with acids or other reagents to effect decomposition of the ore and recovery of soluble values therefrom. The invention is applicable to the digestion and subsequent washing of ores such as phosphate rock or bauxite with an acid such as sulfuric acid to obtain respectively phosphoric acid or aluminum sulfate.

In the digestion of ores with acids or other solvent substances to bring about decomposition of the ore and solution of the soluble values in the ore, it is of paramount importance to obtain the highest possible extraction or yield of soluble values for a given outlay of equipment, consistent with low operating expense. Moreover, it is highly desirable to provide a system of sufficient flexibility that a product of uniform and unvarying predetermined quality may be obtained from ores of varying characteristics, or a product meeting different requirements of quality may be obtained from an ore of fairly uniform composition, without necessitating a modification of the system or major change in operating procedure. The well-known batch system of digestion and washing is capable of operation to give high yields, and it is quite flexible by reason of its manual control, but the high operating expense of a complete batch system, caused by the large number of operatives required, renders its operation seemingly unprofitable as compared with continuous systems, such for example as shown in the U. S. Patent to Spicer, 1,604,427. However, when it is attempted to resort to known continuous systems for the purpose of lowering operating expense, it is found that the lower operating expense of such systems is to a large extent offset by the inability of such systems to produce many products meeting the requirements of trade, concurrently with the obtainment of high yields.

For example, in the treatment of phosphate rock with sulfuric acid to produce phosphoric acid, it is desirable to obtain the highest possible decomposition and recovery of soluble phosphate, and at the same time obtain a product containing very little free sulfuric acid or soluble sulfate. It is, however, impossible to obtain a high decomposition of the phosphate rock unless an amount of digesting acid is used in excess of that required to completely combine with the ore, that is, to obtain high decomposition it is necessary to use an excess of acid and thus have free sulfuric acid present in the product liquor of the digestion. Consequently, in order to meet the demands of the trade in regard to the quality of the product, it is ordinarily necessary to suffer a substantial loss of soluble values in the discharged residue or sludge of the digestion process, when attempting to treat an ore by known continuous digestion, settling, and washing processes. This loss of yield offsets to a considerable extent the lower operating expense of the continuous process.

As a further example of the difficulty encountered in operating known continuous digestion processes may be given the treatment of bauxite with sulfuric acid to obtain aluminum sulfate. This product, to meet the demands of several industries, such as the manufacture of paper and the purification of water, must be slightly basic and contain no free sulfuric acid. It is, however, again difficult to obtain high decomposition without using an excess of digesting acid. Furthermore, rapid and efficient settling of aluminum sulfate digest liquor can be obtained only when the digest is neutral or slightly basic, so that if an attempt is made to use excess digesting acid serious settling difficulties will be encountered and the final product will not be of sufficient clarity and will contain a greater amount of undecomposed insoluble matter than is ordinarily permissible. If an effort is made to conduct the digestion of this ore by known continuous processes, it is again necessary to suffer a loss of soluble values by reason of conducting the digestion with only sufficient acid as will produce a basic product, or of obtaining a product which is unsaleable for many uses by reason of containing free sulfuric acid and too great an amount of insoluble matter.

A further objection to those systems in which the product is continuously withdrawn is the lack of flexibility of such systems to produce products of different quality. The specifications of the product may vary from time to time, and it is frequently found that a given process is not operating at highest efficiency for the production of a given product. It is thus desirable to provide a process which may be operated to give a product of highest purity, and which is also sufficiently flexible to operate efficiently to produce a product of a lower degree of purity. Stated in another manner, the primary purpose of the entire process is to give a predetermined product, the quality of which may vary from time to time, and the means of carrying out the process must be of such nature as to be capable of variation to give most efficient operation for the production of a given product.

I have found that to produce a satisfactory product, that is, containing substantially no free digesting acid and containing not over certain fixed amounts of insoluble matter, irrespective of the quality or nature of the ore, and, at the same time, to obtain a high decomposition and recovery of soluble values from the ore, it is necessary to conduct the settling operation at the point of production of the final product under conditions which may be manually regulated to produce a predetermined result, and which provide for the use of excess reagent for digestion if desired, whereas on the other hand the digestion of the ore and the subsequent washing operation are most efficiently carried out and more uniform results obtained by the use of continuous digestion, settling and washing processes, providing for co-current flow of the digesting reagent and ore, and for counter-current flow of the insoluble sludge and wash liquor. In order to correlate these steps, I have found it necessary to provide for the treatment of the sludge resulting from the digestion and settling operations in such manner as will provide a continuous flow of this material to the continuous washing system through which it subsequently passes.

To make use of the principles above described, I propose to cause the digestion of the ore with the proper amount of acid, separate the digested solid material from the liquor by settling while at a state of rest, withdraw the supernatant product liquor at this point upon completion of the settling period, and then wash the deposited sludge under conditions providing for continuous addition of sludge and wash water to a continuous washing system, and for continuous withdrawal of washed residue and relatively clear liquor. I propose further to provide for subjecting the sludge deposited from the product liquor to a second digestion with an excess of digesting reagent, prior to passing the sludge to the subsequent continuous washing and settling system. This method of operation makes possible the attainment of high recoveries of soluble values from the ore concurrently with the production of a final product of predetermined freedom from the digesting reagent and undecomposed insoluble matter, coupled with low operating expense attendant on the use of mechanical continuous digesting and washing methods. The system overcomes the difficulties of known continuous systems, is sufficiently flexible to produce a product of whatever quality desired, and yet the operating expense is far below that of a complete batch system. To my knowledge, these results have not been secured heretofore, and it is the purpose of my invention to accomplish this and other objects appearing hereinafter.

In the accompanying drawing, I have illustrated one embodiment, in diagrammatic form, of an apparatus adapted to carry out my invention.

The apparatus comprises a plurality of continuous digesters 1, a reservoir 2, a settling tank 3, a second reservoir 4, and a plurality of continuous washers 5, 6, and 7. The apparatus may be constructed of any suitable acid resisting material. The digesters 1 are provided with agitating arms or rakes 8, which are carried by shafts 9, the latter being driven from any suitable source of power. The continuous digesters are connected by launders 11, which permit the liquid carrying finely divided suspended material to overflow from each digester during the operation.

The bauxite, phosphate rock, or other material to be treated is fed continuously to the first digester by a mechanical feeding device 12, which regulates the feed to the exact predetermined amount required. The sulfuric acid solution or other liquid digesting reagent is likewise fed in predetermined proportion from tank 13, through line 14, provided with regulating valve 15. In my preferred method of operation, the proportion of digesting acid to ore is regulated such that substantially all of the acid is utilized in the continuous digesters in combining with the ore. An automatic measuring device may be placed in line 14 if desired.

The mixture of ore and acid entering the first digester is agitated by means of arms 8. The acid carrying finer particles of the ore in suspension overflows continuously into the second digester where the operation is repeated, and as dissolution of the coarser particles occurs this material likewise escapes from the first digester and passes successively through the other digesters with the mixture until substantially all of the acid is utilized by combining with the ore.

Three digesters, as shown in the drawing, are usually sufficient, but digesters may be added or omitted as may be necessary, depending upon the character of the material treated and the activity of the digesting reagent.

The mixture of liquor and solid material passing from the last continuous digester flows into the reservoir tank 2, provided with a continuously operating agitator 16. Reservoir 2 provides a continuously available supply of material for the subsequent settling operation, and is made of sufficient capacity to hold the continuously inflowing stream of material from the continuous digesters.

The mixture of material in the reservoir is continuously stirred by agitator 16, and is thereby maintained substantially uniform in composition. A further opportunity is provided in the reservoir for complete utilization of any remaining uncombined digest acid, and this fact makes it possible to reduce the number or capacity of the continuous digesters which would have to be enlarged or increased if the reservoir were not employed.

The mixture in reservoir 2 is intermittently fed through line 17 and valve 18 into settling tank 3. Here the mixture is allowed to settle, while at a state of rest, for a sufficient period of time to give a supernatant liquor of predetermined clarity. The period of settling may thus be varied by the operator to take care of fluctuations in type of ore and the settling qualities thereof. Moreover, if the specifications of the product permit it to contain a relatively large amount of undecomposed insoluble matter the period of settling may be correspondingly decreased and thus give increased capacity from the system, with consequent higher operating efficiency for this particular operating condition than if the settling period was not independently variable.

Upon completion of the settling period valve 19 is opened and the supernatant product liquor withdrawn through draw-off tube 21 connected through a swivel joint with line 22. As previously stated, the proportion of digest acid to ore added to the digesters 1 was such that substantially all of the acid was utilized in combining with the ore. Accordingly, the product liquor withdrawn from tank 3 will be substantially free of uncombined digest acid. As explained above, this is of particular importance when producing a product which must be free of uncombined digesting reagent to meet the specifications of the trade and thus be saleable. The product liquor passes into storage tank 23 whence it may be withdrawn as desired.

The settled sludge remaining in tank 3 after withdrawal of the product liquor contains, when insufficient acid has been used for complete digestion, a considerable amount of undissolved soluble matter. To effect complete recovery of this soluble matter the sludge is now treated with a second charge of digest acid in substantial excess of the amount required to combine with the soluble values in the sludge. Valve 24 is opened and the sludge is pumped through line 25 into digestion tank 26 by means of a suitable pump 27. Two-way valve 28 is closed to retain the sludge in tank 26. Valve 29 is then opened to permit an addition of fresh digest acid to run into tank 26 through line 31. A proportionate amount of wash water from the subsequent continuous washing operation is also pumped into tank 26 from tank 32 by means of pump 33 in line 34. The relative amounts of fresh digest acid and of wash water are proportioned to give a proper strength of digesting reagent in tank 26. The mixture in the tank is then subjected to agitation by means of agitator 35 for a period of time sufficient to cause thorough mixing of the sludge and acid and extraction of substantially all of the soluble values in the sludge. The agitator is then stopped and the mixture allowed to settle. It will be observed that the supernatant liquor will contain a substantial amount of uncombined digest acid. This will prevent good settling in certain instances, as for example, the treatment of bauxite, but it is unnecessary that thorough settling be obtained at this point for the reason that in tank 3, from which the product liquor is withdrawn, settling may be caused to take place under any desired condition of basicity or neutrality.

Upon completion of the settling period valve 36 is opened and the supernatant liquor passed through draw-off tube 37 and line 38 into tank 39. This liquor will contain a substantial amount of soluble material and a predetermined amount of uncombined digest acid, and is, accordingly, returned through line 41 into the first digester 1, in proper proportion to mix with the fresh digest acid added at this point. In this manner complete utilization of all the digest acid is obtained while at the same time its presence in the product liquor is avoided. A suitable pump 43 and regulating valve 44 are provided in line 41.

After withdrawing the liquor resulting from the digestion in tank 26, a charge of wash water relatively weaker than that added from tank 32 is then pumped into tank 26 from tank 45 through line 46 by means of pump 47. Agitator 35 is then started to cause thorough mixing of the mixture, which is then run into reservoir tank 4 through line 48 by opening two-way valve 28. The purpose of thus adding wash water to the sludge before passing same into reservoir 4 is to give a feed of mix into reservoir 4 of substantially the same density as the mix maintained in the reservoir. Agitator 49 with which reservoir 4 is provided is continuously operated to thereby maintain the mix within the reservoir of uniform composition throughout. The reservoir thus provides a continuously maintained pool of mixed sludge and wash water, which floats in the line connecting the settling tanks with the continuous washing system. The capacity of the reservoir is made sufficiently great to receive the intermittent charges from the settling tanks while continuously discharging a uniform stream of mix to the washing system. By thus providing a reservoir of material between the settling system and the washing system I am enabled to operate the washing system continuously and uniformly from an intermittent supply of material, and irrespective of small fluctuations in the rate of intermittent discharge from the settling tanks.

A uniform stream of mix from reservoir 4 is passed into the first continuous washer and thickener 5 through line 51 controlled by valve 52. The function of washer and thickener 5 is primarily to settle the sludge from the mix, as most of the washing at this stage has taken place in reservoir 4. In the washer and thickener 5, the sludge settles to the bottom while the flowing stream of wash water travels counter-currently thereto and finally overflows from the washer through a launder 53 into tank 32, from which it is subsequently pumped into tank 26 as make-up liquor for the digestion taking place in this tank, as previously explained.

The sludge which settles on the bottoms of the washers and thickeners is moved toward centrally located outlets by scraper arms 62, and is then forced by pumps 54 and 55 through pipes 56 and 57 into the succeeding washers and thickeners. In apparatus 6 and 7 the sludge mixes with wash water originally introduced into the last washer 7 through pipe 58. The operation taking place in these washers is the same as in washer and thickener 5. The sludge settles to the bottom while the flowing stream of wash water passes counter-currently thereto and finally overflows from washer 7 to washer 6 through launder 59, and from washer 6 to tank 45 through launder 61. From tank 45 the wash water is subsequently pumped into tank 26 to form the uniform mix of sludge and wash water passed into reservoir 4, as previously explained. The sludge settling in the final washer 7 is continuously discharged through pipe 59 to waste, or otherwise disposed of.

The capacities of the various digesters, reservoirs, settling tanks, and washers are co-ordinated to provide a uniform flow of material through the system, in accordance with the customary practice followed in known systems. Thus, the capacity of reservoir 2 and of settling tank 3 is such that the digesters 1 may function continuously without any danger, at any time, of overflowing reservoir 2. As is well-known in the art, the length of time required for digesting different types of ore, or for settling digests made from different types of ore, will often vary considerably. For example, the settling time of different types of bauxite may vary from twelve to thirty hours. Accordingly, settling tank 3 is illustrative of one or of a plurality of similar settling tanks. When treating ores requiring a long settling period, it will be necessary to use a greater number of settling tanks for a given production than when the required settling period is relatively shorter.

The temperature in the continuous washers may be regulated as desired for most efficient settling by the addition of heat to the inflowing stream of wash water, or by heating the mix in reservoir 4, or both, and will be substantially uniform throughout the mix in each washer, thus avoiding the formation of eddy currents which disturb settling. The number of washers may be varied as desired depending on the permissible loss of soluble values in the discharged residues, but in any case the final washings which govern the loss of soluble values are mechanically controlled, thus assuring uniform, thorough washing.

It will be seen that the system embodies the advantages of continuous mechanical operation while at the same time producing a product the quality of which may be varied as desired, without sacrificing the attainment of high yields. The number of operatives required is small, as the continuous digesters, reservoirs, and washers require a minimum of attention. The operating expense is thus far below that of a batch system.

Various modifications may be made in the system without departing from the spirit of the invention; for instance, the continuous digesters may be substituted by one or more batch digesters if desirable for the treatment of a particular ore, and I do not desire to limit the invention except as defined in the appended claims.

I claim:

1. The method of treating solid materials with liquid reagents, which comprises digesting the solid material with the liquid reagent, separating the digested solid material from the liquor produced by settling while at a state of rest, withdrawing the supernatant product liquor upon completion of the settling period, and washing the deposited sludge with a flowing stream of wash water traveling counter-current thereto, under conditions providing for continuous settling of sludge from the wash water and continuous withdrawal of the settled sludge.

2. The method of treating solid materials with liquid reagents, which comprises digesting the solid material with the liquid reagent, separating the digested solid material from the liquor produced by settling while at a state of rest for a sufficient period of time to give a liquor of predetermined clarity, withdrawing the supernatant product liquor upon completion of the settling period, and washing the deposited sludge with a flowing stream of wash water traveling counter-current thereto under conditions providing for continuous settling at a substantially uniform temperature of sludge from the wash water and continuous withdrawal of the settled sludge.

3. The method of treating solid materials with liquid reagents, which comprises digesting the solid material with the liquid reagent, separating the digested solid material from the liquor produced by settling while at a state of rest, withdrawing the supernatant product liquor upon completion of the settling period, forming from the deposited sludge a mix of substantially uniform composition by the addition thereto of wash water from a subsequent washing operation, continuously settling the sludge from said mix, washing said sludge with a flowing stream of wash water traveling counter-current thereto, under conditions providing for continuous addition of wash water and continuous withdrawal of settled sludge, and using wash water from said washing operation to form said mix as aforesaid.

4. The method of treating solid materials with liquid reagents, which comprises digesting the solid material with the liquid reagent, separating the digested solid material from the liquor produced by settling while at a state of rest, feeding the deposited sludge and wash water from a subsequent washing operation into a continuously maintained pool of said materials, subjecting said pool to continuous agitation, continuously withdrawing a substantially constant stream of mixed material from said pool, continuously settling the sludge contained in said stream, washing said sludge with a flowing stream of wash water traveling counter-current thereto, under conditions providing for continuous addition of wash water and continuous withdrawal of settled sludge, and feeding wash water from said washing operation into said pool as aforesaid.

5. The method of treating solid materials with liquid reagents, which comprises digesting the solid material with the liquid reagent, separating the digested solid material from the liquor produced by settling while at a state of rest, adding to the deposited sludge a quantity of wash water from a subsequent washing operation, subjecting the mixture to agitation to form a substantially uniform mix, feeding said mix into a separate continuously maintained pool thereof, subjecting said pool to continuous agitation, continuously withdrawing a substantially constant stream of said mix from said pool, continuously settling the sludge contained in said stream, washing said sludge with a flowing stream of wash water traveling counter-current thereto, under conditions providing for continuous addition of wash water and continuous withdrawal of settled sludge, and using the wash water from said washing operation for addition to said sludge as aforesaid.

6. The method of treating solid materials with liquid reagents, which comprises digesting the solid material with the liquid reagent, separating the digested solid material from the liquor produced by settling while at a state of rest, withdrawing the supernatant product liquor upon completion of the settling period, subjecting the deposited sludge to a second digestion with an additional amount of the liquid reagent, separating the digested solid material from the liquor produced by said second digestion by settling while at a state of rest, withdrawing the supernatant liquor upon completion of the settling period for addition as make-up liquor to the liquid reagent used for said first mentioned digestion, and washing the deposited sludge with a flowing stream of wash water traveling counter-current thereto, under conditions providing for continuous settling of sludge from the wash water and continuous withdrawal of the settled sludge.

7. The method of treating solid materials with liquid reagents, which comprises digesting the solid material with the liquid reagent, separating the digested solid material from the liquor produced by settling while at a state of rest, withdrawing the supernatant product liquor upon completion of the settling period, subjecting the deposited sludge to a second digestion with an additional charge of the liquid reagent in amount sufficient to cause the presence of a substantial amount of uncombined reagent in the liquor produced by said second digestion, separating the digested solid material from the liquor produced by settling while at a state of rest, withdrawing the supernatant liquor upon completion of the settling period for addition as make-up liquor to the liquid reagent used for said first mentioned digestion, and washing the deposited sludge with a flowing stream of wash water traveling counter-current thereto, under conditions providing for continuous settling of sludge from the wash water and continuous withdrawal of the settled sludge.

8. The method of treating solid materials with liquid reagents, which comprises digesting the solid material with the liquid reagent, separating the digested solid material from the liquor produced by settling while at a state of rest, withdrawing the supernatant product liquor upon completion of the settling period, subjecting the deposited sludge to a second digestion with an additional charge of the liquid reagent in amount sufficient to cause the presence of a substantial amount of uncombined reagent in the liquor produced by said second digestion, separating the digested solid material from the liquor produced by settling while at a state of rest, withdrawing the supernatant liquor upon completion of the settling period for addition as make-up liquor to the liquid reagent used for said first mentioned digestion, forming from the deposited sludge a mix of substantially uniform composition by the addition thereto of wash water from a subsequent washing operation, continuously settling the sludge from said mix, washing said sludge with a flowing stream of wash water traveling counter-current thereto, under conditions providing for continuous addition of wash water and continuous withdrawal of settled sludge, and using wash water from said washing operation to form said mix as aforesaid.

9. The method of treating solid materials with liquid reagents, which comprises digesting the solid material with an amount of the liquid reagent such that substantially no uncombined reagent will be present in the liquor produced by the digestion, separating the digested solid material from the liquor produced by settling while at a state of rest, withdrawing the supernatant product liquor upon completion of the settling period, subjecting the deposited sludge to a second digestion with an additional charge of the liquid reagent in amount sufficient to cause the presence of a substantial amount of uncombined reagent in the liquor produced by said second digestion, separating the digested solid material from the liquor produced by settling while at a state of rest, withdrawing the supernatant liquor upon completion of the settling period for addition as make-up liquor to the liquid reagent used for said first mentioned digestion, adding to the deposited sludge a quantity of wash water from a subsequent washing operation, subjecting the mixture to agitation to form a substantially uniform mix, feeding said mix into a separate continuously maintained pool thereof, subjecting said pool to continuous agitation, continuously withdrawing a substantially constant stream of mix from said pool, continuously settling the sludge contained in said stream, washing said sludge with a flowing stream of wash water traveling counter-current thereto, under conditions providing for continuous addition of wash water and continuous withdrawal of settled sludge, and using wash water from said washing operation for addition to said sludge as aforesaid.

10. The method of treating solid materials with liquid reagents, which comprises digesting the solid material by continuous agitation while it travels co-current with the liquid reagent in a flowing stream, adding the solid material and liquid reagent in predetermined proportions to the flowing stream, separating the digested solid material from the liquor produced by settling while at a state of rest, withdrawing the supernatant product liquor upon completion of the settling period, and washing the deposited sludge with a flowing stream of wash water traveling counter-current thereto, under conditions providing for continuous settling of sludge from the wash water and continuous withdrawal of the settled sludge.

11. The method of treating solid materials with liquid reagents, which comprises digesting the solid material by continuous agitation while it travels co-current with the liquid reagent in a flowing stream, adding the solid material and liquid reagent to the flowing stream in amounts such that substantially no uncombined reagent will be present in the liquor produced by the digestion, separating the digested solid material from the liquor produced by settling while at a state of rest, withdrawing the supernatant product liquor upon completion of the settling period, subjecting the deposited sludge to a second digestion with an additional charge of the liquid reagent in amount sufficient to cause the presence of a substantial amount of uncombined reagent in the liquor produced by said second digestion, separating the digested solid material from the liquor produced by settling while at a state of rest, withdrawing the supernatant liquor upon completion of the settling period for addition as make-up liquor to the liquid reagent used for said first mentioned digestion, adding to the deposited sludge a quantity of wash water from a subsequent washing operation, subjecting the mixture to agitation to form a substantially uniform mix, feeding said mix into a separate continuously maintained pool thereof, subjecting said pool to continuous agitation, continuously withdrawing a substantially constant stream of mix from said pool, continuously settling the sludge contained in said stream, washing said sludge with a flowing stream of wash water traveling counter-current thereto, under conditions providing for continuous addition of wash water and continuous withdrawal of settled sludge, and using wash water from said washing operation for addition to said sludge as aforesaid.

In testimony whereof, I affix my signature.

JAMES E. EGLESON.